United States Patent [19]

Marechal

[11] Patent Number: 5,540,483
[45] Date of Patent: Jul. 30, 1996

[54] HINGE DEVICE FOR PUBLIC TRANSPORT VEHICLE SEATS AND SEAT STRUCTURE INCLUDING A DEVICE OF THIS KIND

[75] Inventor: Robert R. Marechal, Paris, France

[73] Assignee: Societe Industrielle et Commerciale de Materiel Aeronautique, Issoudun, France

[21] Appl. No.: 253,177

[22] Filed: Jun. 2, 1994

[30] Foreign Application Priority Data

Jun. 9, 1993 [FR] France .................................. 93 06932

[51] Int. Cl.$^6$ ...................................................... A47C 7/00
[52] U.S. Cl. ........................................ 297/440.15; 297/169
[58] Field of Search ............................. 297/440.15, 167, 297/169, 378.1, 354.1, 354.12

[56] References Cited

U.S. PATENT DOCUMENTS

| | | | |
|---|---|---|---|
| 2,016,133 | 10/1935 | Chandler | 297/440.15 X |
| 3,588,172 | 6/1971 | McGregor | 297/169 X |
| 4,364,604 | 12/1982 | Bunelle | 297/440.15 X |
| 4,431,231 | 2/1984 | Elazari et al. | |
| 4,511,178 | 4/1985 | Brennan | 297/167 X |

FOREIGN PATENT DOCUMENTS

| | | |
|---|---|---|
| 0112170 | 6/1984 | European Pat. Off. . |
| 2629687 | 10/1989 | France . |
| 3322511 | 1/1985 | Germany . |
| 3539258 | 5/1986 | Germany . |
| 7410025 | 1/1995 | Netherlands ............... 297/169 |

*Primary Examiner*—Laurie K. Cranmer
*Attorney, Agent, or Firm*—Young & Thompson

[57] ABSTRACT

A hinge device for seats of public transport vehicles—especially airliners—adapted to allow the seat squab frame (2) to tilt relative to the seat cushion frame (3) about a tilt axis (4). The seat squab frame (2) is generally U-shaped with the web forming the top of the seat squab frame (2) and the sides forming the lateral edges (6) of the seat squab frame (2). The seat cushion frame (3) has a rear part (7) including two rear free ends (8). The tilt axis is horizontal and passes through the rear free ends (8) of the seat cushion frame (3) and the free ends (9) of the lateral edges (6) of the seat squab frame (2). The hinge device includes at least one free end (9) of the seat squab frame (2) a journal member (10) rigidly coupled with and fastened to the seat squab frame (2), projecting out of the seat squab frame (2) and aligned with the tilt axis; at the rear free end (8) facing the journal member (10) a journal support (11) rigidly coupled with and fastened to the rear part (7) of the seat cushion frame (3), projecting into the seat cushion frame (3) and aligned with the tilt axis; the journal member (10) and the journal support (11) having respective coupling structure (12, 13) providing a removable and secure coupling and enabling rotation of the journal member (10) about the tilt axis, the journal member (10) extending axially over a substantial part of the tilt axis segment between the free end (9) of the seat squab frame (2) and the rear free end (8) of the seat cushion frame (3).

8 Claims, 4 Drawing Sheets

HINGE DEVICE FOR PUBLIC TRANSPORT VEHICLE SEATS AND SEAT STRUCTURE INCLUDING A DEVICE OF THIS KIND

The disclosure is of a hinge device for seats on public transport vehicles—especially airliners—and a seat structure including a device of this kind.

To be more precise, the hinge device is adapted to allow the seat squab frame to tilt relative to the seat cushion frame about a tilt axis. The seat squab frame is generally U-shaped with the web forming the top of the seat squab frame and the sides forming the lateral edges of the seat squab frame.

The seat cushion frame has a rear part including two rear free ends. The tilt axis is horizontal and passes through the rear free ends of the seat cushion frame and the free ends of the lateral edges of the seat squab frame. Each free end of the lateral edges of the seat squab frame is hinged to a rear free end of the seat cushion frame by hinge means so that it can pivot about the tilt axis.

The seat usually also includes a member for operating the seat squab frame and holding it in position. This member is usually rigidly coupled with the seat cushion frame and cooperates via an appropriate link with the seat squab frame to adjust the position of the seat squab frame and to hold it in position. The seat squab frame usually has three positions, namely: a vertical or seated position, a reclined to the rear or extended position and an inclined to the front or breakover position. The first two positions are positions of normal use and the third position is an occasional crash or storage position.

Known hinge means allowing the seat squab frame to tilt relative to the seat cushion frame often comprise many component parts, the main one of which is a shaft member extending over a substantial portion of the segment of the tilt axis between the free end of the seat squab frame and the rear free end of the seat cushion frame. This shaft member is coupled rigidly with and fastened to the seat cushion frame. The free end of the lateral edge of the seat squab frame is free to rotate about the shaft member.

This shaft member fastened to the seat cushion frame usually provides the rotation axis for a mechanical part supporting a passenger tray for the passenger seated in line with and behind the seat.

The link of the member for operating the seat squab frame and holding it in position must be fastened to the seat squab frame. Accordingly, it is fastened directly to the lateral edge of the seat squab frame. The disposition of the link in direct contact with the lateral edge of the seat squab frame means that the operating member must be a substantial distance from the seat cushion frame components.

A first drawback of this type of means is therefore the result of the need for additional stiffener members to retain the operating member to the seat cushion frame. FR-A-2 629 687 clearly shows this drawback.

Another drawback of the means described above arises from the multiple component parts and the resulting long times required to assemble the seat squab frame to the seat cushion frame and to demount it therefrom. This is a major drawback in that any time that can be saved in maintaining aircraft impacts strongly on the real cost of operating the aircraft. Mounting and demounting a seat squab frame coupled to a seat cushion frame by the means described above is even more complicated in that it requires the tray to be demounted first, as it cannot be demounted at the same time as the seat squab frame.

An object of the present invention is to alleviate the above drawbacks by proposing a hinge device for seats on public transport vehicles—especially airliners—having a minimal number of component parts, enabling assembly of the seat squab frame and tray without tools and moving the actuator link significantly closer to the seat cushion frame operating member so that no additional stiffener is needed.

To this end, the invention concerns a hinge device for public transport vehicles—especially airliners adapted to allow the seat squab frame to tilt relative to the seat cushion frame about a tilt axis. The seat squab frame is generally U-shaped with the web forming the top of the seat squab frame and the sides forming the lateral edges of the seat squab frame. The seat cushion frame has a rear part including two rear free ends. The tilt axis is horizontal and passes through the rear free ends of the seat cushion frame and the free ends of the lateral edges of the seat squab frame.

According to the invention the hinge device includes at at least one free end of the seat squab frame a journal member rigidly coupled with and fastened to the seat squab frame, projecting out of the seat squab frame and aligned with the tilt axis. The rear free end facing the journal member includes a Journal support rigidly coupled with and fastened to the rear part of the seat cushion frame, projecting into the seat cushion frame and aligned with the tilt axis. The journal member and the journal support have respective coupling means providing a removable and secure coupling between them and enabling rotation of the journal member about the tilt axis.

One feature of the journal member is that it extends axially over a substantial part of the tilt axis segment between the free end of the seat squab frame and the rear free end of the seat cushion frame.

The invention also concerns a seat structure for public transport aircraft—especially airliners—comprising a plinth, a seat cushion frame and a seat squab frame which can be tilted about a tilt axis. This structure includes at least one hinge device in accordance with the invention.

The structure further includes a member for operating the seat squab frame and holding it in position. This member is rigidly coupled with the seat cushion frame and cooperates via an appropriate link with the seat squab frame to allow the seat squab frame to be adjusted and held in position.

The structure finally includes a retractable passenger tray device adapted to be used by the passenger seated behind and in line with the seat. In accordance with the invention this structure includes hinge devices in accordance with the invention.

One advantage of the present invention is the facility to mount the seat squab frame on the seat cushion frame and to demount it therefrom quickly and without using tools.

Another advantage is that a seat squab can be fully assembled (padding, seat cover, tray on back) in a workshop and that a seat squab can be exchanged on board the aircraft in just a few seconds. At present the cover has to be removed from the seat squab to provide access to the fasteners so that they can be removed and replaced.

This reduces maintenance times and increases the productivity of the aircraft.

Another advantage of the present invention is that the passenger tray device can be mounted or demounted at the same time as the seat squab frame or separately.

Another advantage of the present invention is that the actuator link can, because of the journal member, be moved much closer to the seat cushion frame operating means so that no additional stiffener is needed.

Other features of the invention emerge from the following description with reference to the appended figures, in which.

Figure 6:
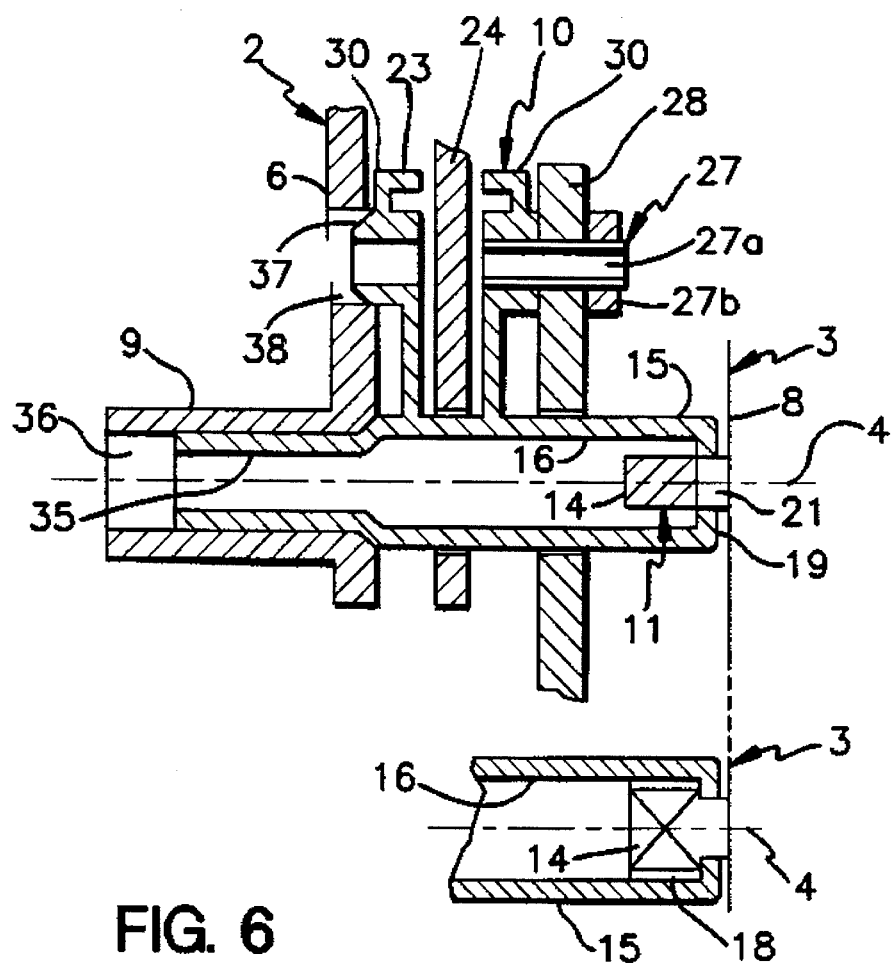

FIG. 6. is a diagrammatic axial section of the hinge device in accordance with the invention.

Figure 7:
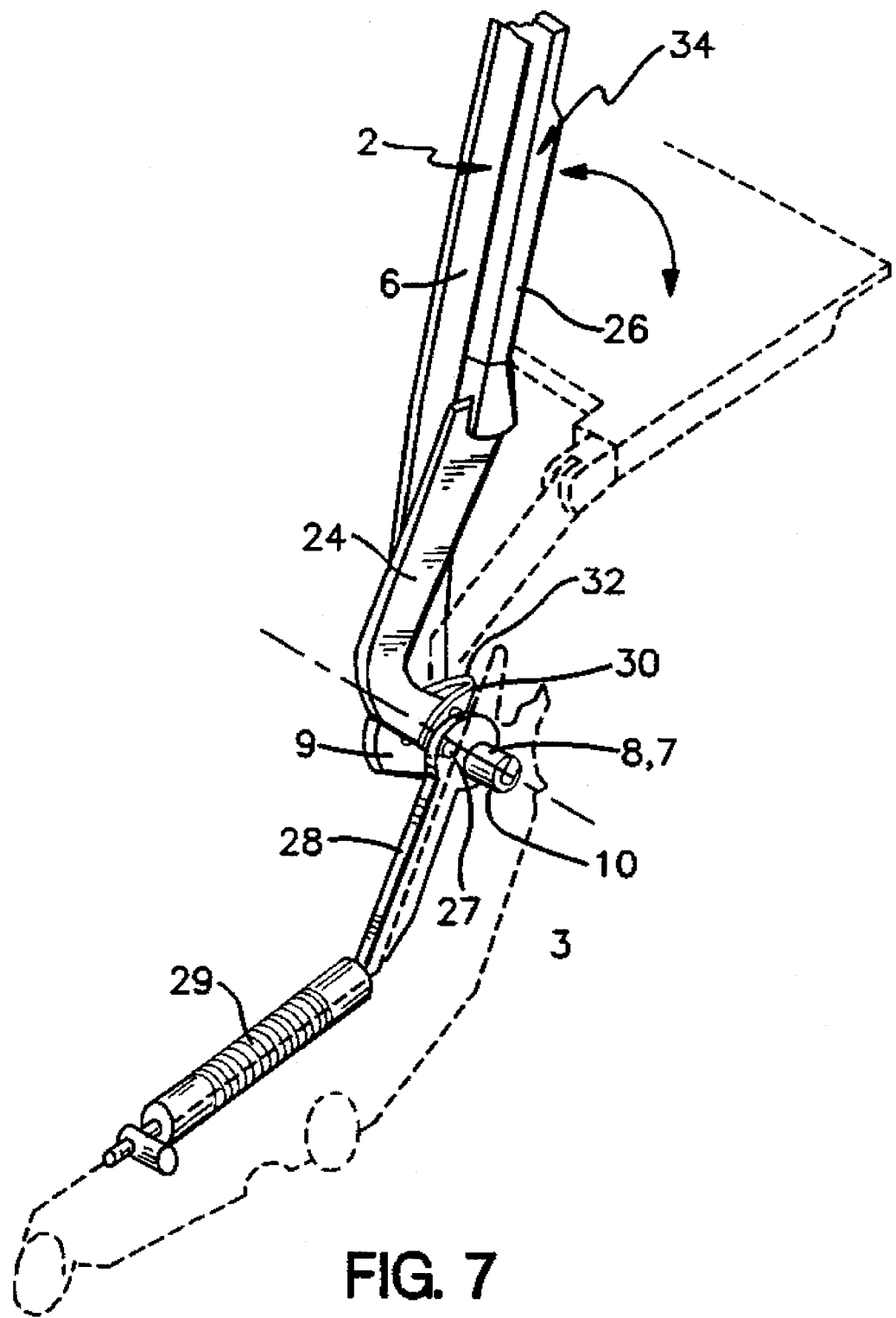

FIG. 7 is a diagrammatic partial perspective view of a seat structure in accordance with the invention.

The hinge device for seats of public transport vehicles—especially airliners—is designed to fit between a seat squab frame 2 and a seat cushion frame 3 of the seat. The object of the hinge device is to enable the seat squab frame 2 to tilt relative to the seat cushion frame 3 about a tilt axis 4.

The seat squab frame has a conventional U-shape whose web forms the top of the seat squab frame and whose arms form the lateral edges 6 of the seat squab frame 2.

The seat cushion frame 3 includes in the conventional way a rear part having two rear free ends 8.

also in the conventional way, the tilt axis 4 is horizontal with the seat in service and passes through the rear free ends 8 of the seat cushion frame 3 and the free ends 9 of the lateral edges 6 of the seat squab frame 2.

At least one free end 9 of the seat squab frame 2 includes a journal member 10 rigidly coupled with and fastened to the seat squab frame 2. The journal member 10 projects towards the outside of the seat squab frame 2. The journal member 10 is aligned with the tilt axis 4. The rear free end 8 facing the journal member 10 includes a journal support 11 coupled rigidly with and fastened to the rear part 7 of the seat cushion frame 3. The journal support 11 projects towards the inside of the seat cushion frame 3 and is aligned with the tilt axis 4. The journal member 10 and the journal support 11 have respective mutual coupling means 12, 13 providing a removable and secured coupling and enabling rotation of the journal member 10 about the tilt axis 4. In accordance with the invention the journal member 10 fastened to the seat squab frame extends in the axial direction over a substantial part of the segment of the tilt axis 4 between the free end 9 of the seat squab frame 2 and the rear free end 8 of the seat cushion frame 3. The effect of this feature is that the active part of this segment of the shaft is fastened to the seat squab frame.

Accordingly, when the seat squab frame is mounted or demounted all the parts coupled to the journal member 10 can be mounted or demounted with the seat squab frame.

In accordance with the invention the hinge device comprises a journal member 10 at each free end 9 of the edges 6 and a journal support 11 at each rear free end 8 of the seat cushion frame 3.

Figure 1:
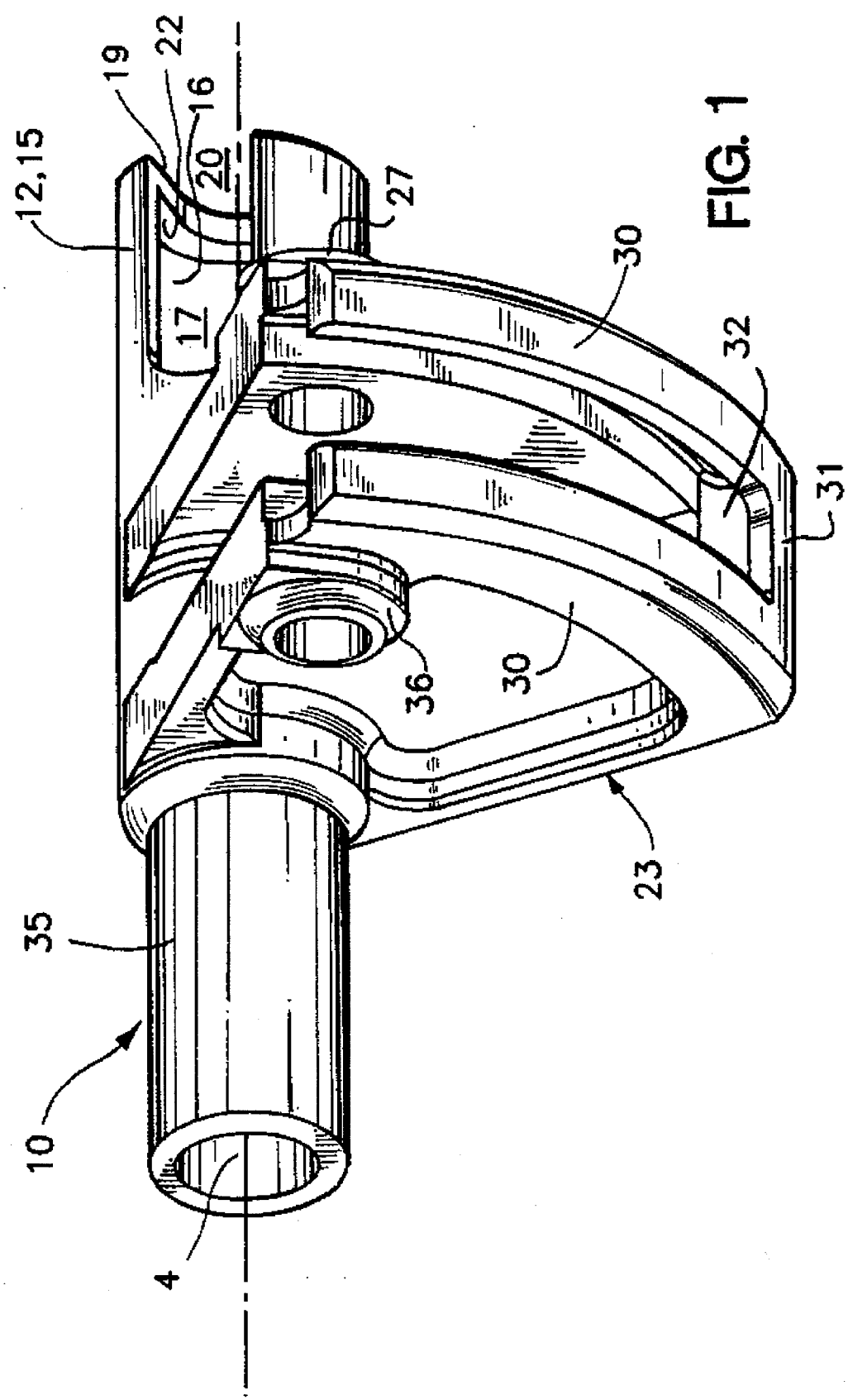
FIG. 1 is a diagrammatic perspective view of the journal member of a hinge device in accordance with the invention.
Figure 2:
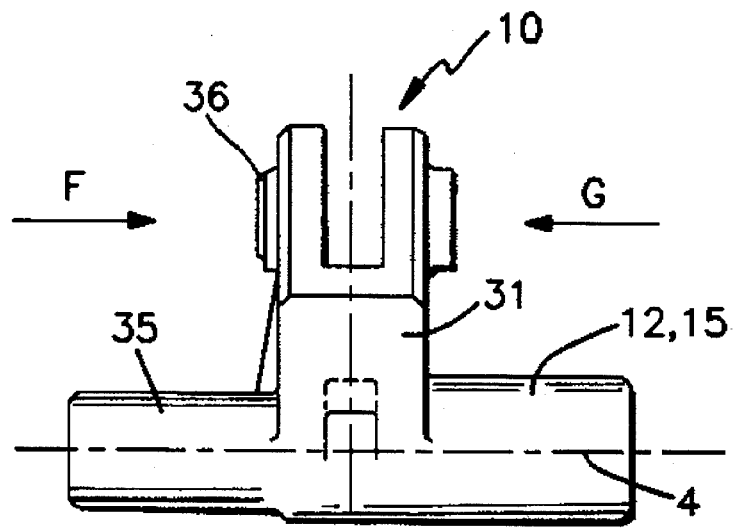
FIG. 2 is a diagrammatic front view of the journal member shown in FIG. 1.
Figure 3:
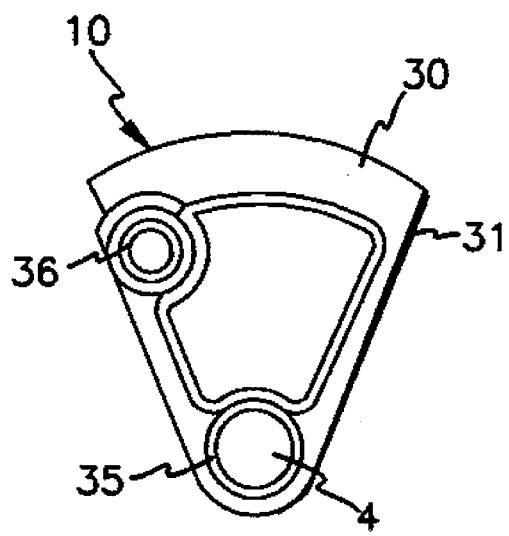
FIG. 3 is a diagrammatic view of the journal member shown in FIG. 2 as seen in the direction of the arrow F
Figure 4:
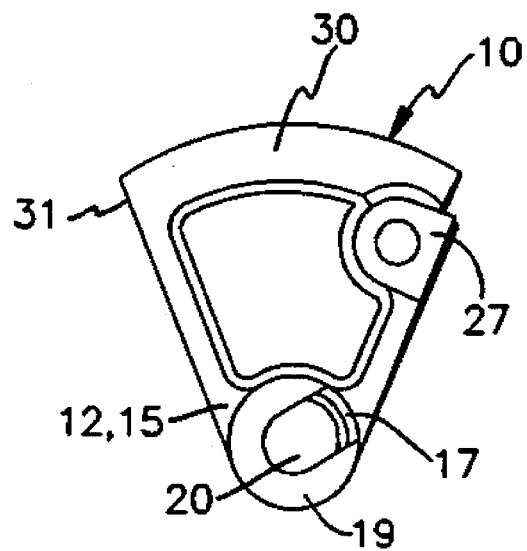
FIG. 4 is a diagrammatic view of the journal member shown in FIG. 2 as seen in the direction of the arrow G.
Figures 5A, 5B, 5C, 5D:
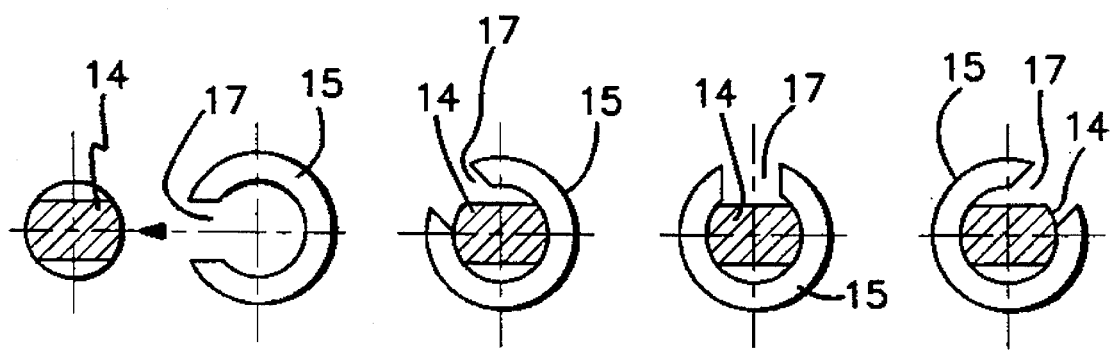
FIGS. 5a to 5d are diagrammatic part transverse sections of a journal member and the journal support of a hinge device in accordance with the invention, respectively in the coupling position, the break-over position, the seated position and the reclined position.

In accordance with the invention the hinge device has a coupling position in which the journal member 10 and the journal support 11 are coupled without tools (FIG. 5a) and at least one service position in which the coupling of the journal member 10 and the journal support 11 is secured (FIGS. 5b, 5c, 5d).

In the following description qualifiers such as "radial", "longitudinal" and "transverse" are used with reference to the tilt axis 4.

In one specific embodiment of the invention, in the coupling position, the journal member 10 is free to move in translation relative to the journal support 11 in a coupling direction radial to the tilt axis 4. In the secured service positions the journal member 10 is immobilized in all directions radial to the tilt axis 4.

In the coupling position, which is the position for mounting the seat squab frame on and demounting it from the seat cushion frame, the seat squab frame is therefore mounted or demounted by moving it in translation in the coupling direction.

In the embodiment shown and in accordance with the invention the coupling means 12 of the journal support 11 comprise a flat 14 extending on the side opposite the seat cushion frame 3 in a plane radial to the tilt axis 4. The flat 14 extends to both sides of the tilt axis 4 and its median line is coincident with the tilt axis.

The coupling means of the journal member 10 comprise a tubular member 15 of the journal member 10 with a cylinder of revolution interior wall 16 concentric with the tilt axis 4. The tubular member 15 has on the side opposite the seat squab frame a longitudinal slot 17 extending along a generatrix of the cylindrical interior wall 16. The radial length of the flat 14 is substantially equal to the inside diameter of the tubular member 15 and its thickness is less that the thickness of the longitudinal slot 17.

In the coupling position the virtual radial plane through the longitudinal slot 17 is coincident with the radial plane of the flat 14. The flat 14 is disposed inside the tubular member 15 and facing the longitudinal slot 17. Radial movement in translation in the radial plane of the flat 14 separates the coupling means from the journal member 10 and the journal support 11. This demounts the seat squab frame from the seat cushion frame.

Similarly, to couple or mount the seat squab frame to the seat cushion frame the virtual radial plane through the slot has to be aligned with the radial plane of the flat after which the cylindrical inside wall 16 is brought into contact with a distal edge 18 of the flat by movement in translation through the longitudinal slot. To go from the coupling position to a secured service position the seat squab frame 2 is tilted about the tilt axis 4 so that the virtual radial plane through the slot is not aligned with the radial plane of the flat 14, the distal edges 18 of the flat 14 cooperating with the interior wall 16 of the tubular member 15.

In the preferred embodiment of the invention the end of the tubular member 15 advantageously has a closed base with a radial slot 20 aligned with the longitudinal slot 17. This radial slot 20 provides a passage for a cylindrical rod member 21 concentric with the tilt axis 4, interleaved between the seat cushion frame 3 and the flat 14. The diameter of this rod member is less than the radial length of the flat. The flat 14 therefore cooperates with the inside 22 of the base 19 to immobilize the seat squab frame 2 against movement in translation along the tilt axis 4 relative to the seat cushion frame 3 at least in the direction tending to move the edges 6 of the seat squab frame 2 away from the seat cushion frame 3.

Alternatively, and without departing from the scope of the invention, the tubular member could be carried by the journal support 11 and the flat 14 by the journal member 10.

In the preferred embodiment of the invention the journal member 10 and its coupling means 12 are in one piece. This can be of cast or machined metal.

Similarly the journal support 11 and its coupling means 13 are in one cast or machined piece.

The aircraft seat structure in accordance with the invention includes, in addition to a seat cushion frame, a tiltable seat squab frame and at least one hinge device as described above, a member 29 for operating the seat squab frame and holding it in position, an appropriate actuator link 28 and a device 34 carrying a retractable passenger tray 26 designed to be used by the passenger seated in the seat behind said structure and in line with it.

The member for operating the seat squab frame and holding it in position is rigidly coupled with the seat cushion frame and cooperates via the link 28 with the seat squab frame 2 to enable the seat squab frame to be adjusted and held in position. The link 28 is rigidly coupled with the seat squab frame for rotation about the tilt axis.

The passenger tray device 34 further includes a mechanical part 24 supporting the passenger tray 26 and rotatable about the tilt axis 4.

In the preferred embodiment of the invention the journal member 10 includes a device 23 for holding, guiding and immobilizing in its service position the mechanical part 24 on rotation about the tilt axis 4.

The mechanical part 24 is removably mounted on the journal member without tools.

The holding, guiding and immobilizing device 23 comprises two transverse radial flanges 30 fastened to the journal member 10 defining the guide for the mechanical part 24. The holding, guiding and immobilizing device further comprises a longitudinal radial web 31 linking the two flanges 30 and defining therewith a seating 32 against which the mechanical part 24 abuts in its service position. The transverse radial flanges 30 and the longitudinal radial web 31 can advantageously be apertured to lighten the journal member.

In the preferred embodiment of the invention the journal member 10 further includes a device for fastening to the seat squab frame the actuator link 28 of the member for tilting the seat squab frame 29 and holding it in position. The actuator link 28 is free to rotate about the journal member 10 and is fixed to the radial flange 30 nearer the seat cushion frame 3, so that the link rotates with the seat squab frame about the tilt axis 4. The coupling of the operating member to the seat cushion frame therefore requires no additional stiffeners to be attached.

The means fixing the link to the flange preferably comprise a threaded rod 27a fastened to the flange and a bolt 27b.

In the preferred embodiment of the invention the journal member 10 includes a first tubular projection 35 aligned with the tilt axis 4 on the seat squab frame 2 side cooperating with a first orifice 36 in the free end 9 of the lateral edge 6 of the seat squab frame 2 and a second projection 37 offset radially relative to the first projection 35 cooperating with a second orifice 38 likewise offset on the free end 9 of the lateral edge 6 of the seat squab frame 2, so that the journal member 10 rotates with the seat squab frame 2 about the tilt axis 4.

In the embodiment shown and in accordance with the invention the radial plane of the flats 14 is horizontal and the seat structure has four positions: the coupling position, or mounting-demounting position, in which the seat squab is folded towards the seat cushion so that the plane of the seat squab frame is at an angle to the horizontal between 25° and 35°, preferably 32.5°; a break-over position corresponding to a crash service position with the seat squab folded towards the seat cushion and at an angle of about 70° to the horizontal; the seated position, the service position when the passenger is seated; and the extended position, the service position when the passenger is reclined.

In the preferred embodiment of the invention the transverse radial flanges 30 of the holding device 23 subtend an angle of between 40° and 60°, preferably 50° from the plane of the seat squab frame 2 towards the rear of the seat squab frame 2.

I claim:

1. In a seat for a public transport vehicle, the seat comprising a seat squab frame (2) that tilts on a hinge device relative to a seat cushion frame (3) about a tilt axis (4), said seat squab frame (2) being generally U-shaped with a web forming a top of the seat squab frame (2) and sides forming lateral edges (6) of the seat squab frame (2), said seat cushion frame (3) having a rear part (7) including two rear free ends (8), said tilt axis being horizontal and passing through the rear free ends (8) of the seat cushion frame (3) and through free ends (9) of the lateral edges (6) of the seat squab frame (2); the improvement wherein said hinge device includes:

i) at least at one free end (9) of the seat squab frame (2) a removable journal member (10) rigidly coupled with and fastened to the seat squab frame (2), projecting out of the seat squab frame (2) and aligned with the tilt axis;

ii) at the rear free end (8) of the seat cushion frame (3) facing the journal member (10) a journal support (11) adapted to support the journal member (10) rigidly coupled with and fastened to the rear part (7) of the seat cushion frame (3), projecting into the seat cushion frame (3) and aligned with the tilt axis;

iii) coupling means (12, 13) on the journal member (10) and the journal support (11) respectively adapted to couple the journal member (10) and the seat back (2) with the journal support (11) and the seat bottom (3), and providing a coupling position enabling rotation of the journal member (10) about the tilt axis (4), the journal member (10) extending axially over a part of the tilt axis segment between the free end (9) of the seat squab frame (2) and the rear free end (8) of the seat cushion frame (3).

2. A seat according to claim 1, wherein each free end (9) of the seat squab frame (2) has a journal member (10) and each rear free end (8) of the seat cushion frame (3) has a journal support (11).

3. A seat according to claim 1, wherein the journal support (11) and its coupling means (13) are in one piece.

4. A device according to claim 1, which has a coupling position in which the journal member (10) and the journal support (11) are assemblable and disassemblable without the use of tools and at least one secured service position in which the coupling of the journal member (10) and the journal support (11) are secured together but rotatable relative to each other.

5. A seat according to claim 4, wherein in the coupling position the journal member (10) is free to move in translation relative to the journal support (11) in a coupling direction radial to the tilt axis (4) and in that in the secured service position the journal member (10) is immobilized in all directions radial to the tilt axis (4).

6. A seat according to claim 4, wherein the coupling means of the journal support (11) comprise a flat (14) extending from the side opposite the seat cushion frame (3) in a plane radial to the tilt axis (4), with its median line coincident with the tilt axis (4) and the coupling means (12) of the journal member (10) comprise a tubular member (15) with a cylindrical inside wall (16) concentric with the tilt axis (4) having on the side opposite the seat squab frame (2) a longitudinal slot (17) extending along a generatrix of the cylindrical internal wall (16), said flat (14) having a radial length substantially equal to the inside diameter of the tubular member (15) and a thickness less that the thickness of the longitudinal slot (17) so that in the coupling position the virtual radial plane through the slot is coincident with the radial plane of the flat (14), the flat (14) being inside the tubular member (15) and facing the longitudinal slot (17), and in the secured service position said virtual radial plane is not aligned with the radial plane of the flat (14), the distal edges (18) of the flat (14) cooperating with the inside wall (16) of the tubular member (15).

7. A seat according to claim 6, wherein the end of the tubular member (15) is a closed base (19) having a radial slot (20) aligned with the longitudinal slot (17) and enabling the passage of a cylindrical rod member (21) concentric with the tilt axis (4) and disposed between the seat cushion frame (3) (or the seat squab frame (2)) and the flat (14) so that the inside surface (22) of the base (19) cooperates with the flat (14) to immobilize movement in translation along the tilt axis (4) of the seat squab frame (2) relative to the seat cushion frame (3) at least in the direction tending to move the seat squab frame (2) away from the seat cushion frame (3).

8. A seat according to claim 4, wherein the journal member (10) and its coupling means (12) are in one piece.

* * * * *